United States Patent
Kozuka (10) Patent No.: US 12,384,084 B2
(45) Date of Patent: Aug. 12, 2025

(54) RESIN SWITCHING ASSIST METHOD AND APPARATUS FOR MOLDING MACHINE

(71) Applicant: NISSEI PLASTIC INDUSTRIAL CO., LTD., Nagano-ken (JP)

(72) Inventor: Makoto Kozuka, Hanishina-gun (JP)

(73) Assignee: NISSEI PLASTIC INDUSTRIAL CO., LTD., Nagano-Ken (JP)

( * ) Notice: Subject to any disclaimer, the term of this patent is extended or adjusted under 35 U.S.C. 154(b) by 20 days.

(21) Appl. No.: 18/386,886

(22) Filed: Nov. 3, 2023

(65) Prior Publication Data

US 2024/0149515 A1    May 9, 2024

(30) Foreign Application Priority Data

Nov. 4, 2022    (JP) ................... 2022-177075

(51) Int. Cl.
    B29C 45/76         (2006.01)
(52) U.S. Cl.
    CPC ........ B29C 45/762 (2013.01); B29C 45/7646 (2013.01); *B29C 2945/7605* (2013.01); *B29C 2945/76876* (2013.01); *B29C 2945/76939* (2013.01)
(58) Field of Classification Search
    CPC .............. B29C 45/762; B29C 45/7646; B29C 2945/7605; B29C 2945/76876; B29C 2945/76939; B29C 45/78; B29C 2945/76056; B29C 2945/76063; B29C 2945/76428; B29C 2945/76906; B29C 45/76; B29C 45/1753
See application file for complete search history.

(56) References Cited

FOREIGN PATENT DOCUMENTS

JP      2017222144 A    *   12/2017

* cited by examiner

*Primary Examiner* — S. Behrooz Ghorishi
(74) *Attorney, Agent, or Firm* — Birch, Stewart, Kolasch & Birch, LLP

(57) ABSTRACT

For each of different resins R, a zero shear viscosity $\eta_0$ of each resin R is obtained by using a conversion function expression whose parameters are a melt flow rate (MFR) and a set temperature of a heating cylinder and is registered. Also, a purge resin required amount Wu corresponding to a viscosity difference $\eta d$ between the zero shear viscosity $\eta$ of of a former resin Rf and the zero shear viscosity $\eta$ os of a succeeding resin Rs is registered. When resin switching is performed, the zero shear viscosity $\eta$ of of the former resin Rf and the zero shear viscosity $\eta$ os of the succeeding resin Rs are obtained by inputting the MFR of the former resin Rf and the MFR of the succeeding resin Rs to a molding machine controller, the viscosity difference $\eta d$ between the zero shear viscosity $\eta$ of of the former resin Rf and the zero shear viscosity $\eta$ os of the succeeding resin Rs is obtained, an amount of a purge resin required for resin switching is obtained as a purge resin required amount Wu, and at least the obtained purge resin required amount Wu is displayed.

7 Claims, 7 Drawing Sheets

| SAMPLE | FORMER RESIN | SUCCEEDING RESIN | $\eta os\,(200°C)$ $-$ $\eta of\,(200°C)$ | $\eta os\,(200°C)$ $-$ $\eta ofe\,(250°C)$ | TOTAL |
|---|---|---|---|---|---|
| 1 | A | A | 0.0 | 3988.7 | 3988.7 |
| 2 | B | B | 0.0 | 14129.2 | 14129.2 |
| 3 | C | C | 0.0 | 1019.1 | 1019.1 |
| 4 | A | B | 11221.1 | 15209.8 | 26430.9 |
| 5 | C | B | 17122.9 | 18142.0 | 35264.8 |
| 6 | C | A | 5901.8 | 6920.9 | 12822.7 |
| 7 | B | A | −11221.1 | 2908.1 | −8313.0 |
| 8 | B | C | −17122.9 | −2993.7 | −20116.6 |
| 9 | A | C | −5901.8 | −1913.1 | −7814.9 |
| 10 | B | D | 3560.0 | 17689.2 | 21249.2 |
| 11 | E | D | 9729.7 | 15572.6 | 25302.3 |
| 12 | D | B | −3560.0 | 12695.2 | 9135.2 |
| 13 | D | E | −9729.7 | 6525.5 | −3204.2 |
| 14 | F | F | 0.0 | 27799.8 | 27799.8 |
| 15 | C | C | 0.0 | 1684.0 | 1684.0 |

Fig.8

RESIN SWITCHING ASSIST METHOD AND APPARATUS FOR MOLDING MACHINE

TECHNICAL FIELD

The present invention relates to a resin switching assist method and apparatus for a molding machine which assist an operator in performing a resin switching process of discharging a former resin from a heating cylinder and supplying a succeeding resin to the heating cylinder.

BACKGROUND ART

In general, in the case where articles which differ in resin type and/or color are successively produced using an injection molding machine, a former resin used in former production must be switched to a succeeding resin to be used in subsequent production. Therefore, after completion of the former production, switching of resin is performed by a resin switching process. In the resin switching process, in general, after the resin (former resin) remaining in the heating cylinder is discharged, the succeeding resin which is to be used in the subsequent production is suppled. Therefore, it is demanded to prevent the remaining former resin from mixing with the succeeding resin at the time of start of the subsequent production.

A conventionally known technique for assisting an operator in performing such a resin switching process is disclosed in Patent Document 1, in which a resin switching assist method (assist apparatus) for a molding machine has been proposed by the present applicant. An object of the resin switching assist method for a molding machine disclosed in Patent Document 1 is to allow an operator to precisely (exactly) know the necessity of an intermediate material, thereby contributing to reduction of material cost, shortening of resin switching time, and suppression of generation of useless defective articles. Specifically, when resin switching is performed by supplying the succeeding resin after discharging the former resin from the heating cylinder, a determination as to whether or not an intermediate material is necessary is made using a database prepared beforehand. For each of resin types, an apparent viscosity which correlates with a predetermined operational physical quantity in a molding machine is obtained beforehand, and the obtained apparent viscosity is stored in a database. At the time of resin switching in the molding machine, a molding machine controller calculates a viscosity difference index which relates to a viscosity difference obtained by subtracting the apparent viscosity of the former resin from the apparent viscosity of the succeeding resin which is chosen in the resin switching process and whose apparent viscosity is stored in the database. The molding machine controller then determines whether the obtained viscosity difference index is positive or negative. At least in the case where the molding machine controller determines that the obtained viscosity difference index is negative, the molding machine controller outputs a determination result indicating that an intermediate material is necessary.

SUMMARY OF INVENTION

Technical Problem

However, the above-described conventional technique relating to resin switching has the following problems to be solved.

Namely, it is necessary to temporarily use, as a testing machine, a molding machine owned by a user, perform a test for each resin, and obtain its apparent viscosity (relative density). Therefore, there have been problems which hinder production such as a problem that the molding machine cannot be used when the test is performed. In addition, although specific processing such as calculation processing can be executed by software contained in the molding machine controller, the testing work itself must be performed by operating the molding machine while using a resin. Also, the user (operator) by him/herself must perform testing work, which follows the resin switching process, at a production site. Therefore, there has been a problem that labor and time are consumed by the testing work.

Consequently, the conventional method involving the testing work at the site is not necessarily desirable for a novice or the like which is unfamiliar with the testing work, may cause a decrease in production efficiency and an increase in production cost, and may result in failure to sufficiently secure the stability and reliability of the assist method, because of variation in the testing work.

An object of the present invention is to provide a resin switching assist method and apparatus for a molding machine which have solved the above-described problems of the conventional technique.

Solution to Problem

In order to solve the above-described problem, a resin switching assist method for a molding machine according to the present invention assists an operator in performing a resin switching process of discharging a former resin Rf from a heating cylinder 2 and then supplying a succeeding resin Rs to the heating cylinder 2. In advance of the resin switching process, for each of different resins R, a zero shear viscosity $\eta o$ of each resin R is estimated by using a conversion function expression whose parameters are a melt flow rate (MFR) and a set temperature of the heating cylinder 2, the estimated zero shear viscosity is registered in a first database DB1 in a molding machine controller 3, and a purge resin required amount Wu is registered in a second database DB2 in the molding machine controller 3. The purge resin required amount Wu corresponds to a viscosity difference $\eta d$ between the zero shear viscosity $\eta of$ of the former resin Rf and the zero shear viscosity $\eta os$ of the succeeding resin Rs. In the resin switching process, the zero shear viscosity $\eta of$ of the former resin Rf and the zero shear viscosity $\eta os$ of the succeeding resin Rs are obtained from the first database DB1 by inputting an MFR of the former resin Rf and an MFR of the succeeding resin Rs to the molding machine controller 3, the viscosity difference $\eta d$ between the zero shear viscosity $\eta of$ of the former resin Rf and the zero shear viscosity $\eta os$ of the succeeding resin Rs is obtained, an amount of a purge resin required for resin switching is obtained, as a purge resin required amount Wu, from the second database DB2, and at least the obtained purge resin required amount Wu is displayed.

Also, in order to solve the above-described problem, a resin switching assist apparatus 1 for a molding machine according to the present invention assists an operator in performing a resin switching process of discharging a former resin Rf from a heating cylinder 2 and then supplying a succeeding resin Rs to the heating cylinder 2. The resin switching assist apparatus 1 comprises a molding machine controller 3 which comprises:

a first database DB1 in which zero shear viscosities $\eta o$ of different resins R are registered, the zero shear viscosity $\eta$o of each resin R being estimated by using a conversion function expression whose parameters are a melt flow rate (MFR) and a set temperature of the heating cylinder 2;

a second database DB2 in which a purge resin required amount Wu corresponding to a viscosity difference $\eta$d between the zero shear viscosity $\eta$of of the former resin Rf and the zero shear viscosity $\eta$os of the succeeding resin Rs is registered;

an MFR inputting functional section Fi for inputting an MFR of the former resin Rf and an MFR of the succeeding resin Rs;

a viscosity difference calculating functional section Fs which obtains the zero shear viscosity $\eta$of of the former resin Rf and the zero shear viscosity $\eta$os of the succeeding resin Rs from the first database DB1 on the basis of the input MFRs of the former resin Rf and the succeeding resin Rs and calculates the viscosity difference $\eta$d between the zero shear viscosity $\eta$of of the former resin Rf and the zero shear viscosity $\eta$os of the succeeding resin Rs;

a required amount calculating functional section Fw which obtains, as a purge resin required amount Wu, an amount of a purge resin required for the resin switching, from the second database DB2 on the basis of the obtained viscosity difference $\eta$d; and a display processing functional section Fo which performs at least processing for displaying the obtained purge resin required amount Wu.

In preferred modes of the present invention, the succeeding resin Rs may include an intermediate material Rms. In the case where the heating cylinder 2 is divided into three regions in an axial direction such that the heating cylinder has a forward portion 2f, a middle portion 2m, and a Rear Portion 2r, a Region Containing the Forward Portion 2f and a portion located forward of the forward portion is defined as a high-temperature-side region ZAu, and a region containing the middle portion 2m and a portion located rearward of the middle portion is defined as a low-temperature-side region ZAd, the temperature of the heating cylinder 2 is desirably set such that the temperature difference between the high-temperature-side region ZAu and the low-temperature-side region ZAd falls within the range of 0° C. to 50° C. Furthermore, the resins R may include general-purpose resins, engineering plastics, super engineering plastics, composite materials, purge materials, and special resins other than the purge materials. In the assist apparatus 1, when the zero shear viscosity $\eta$os of the succeeding resin Rs is lower than the zero shear viscosity $\eta$of of the former resin Rf, the viscosity difference calculating functional section Fs may output a message indicating that a purge material is necessary. The display processing functional section Fo may have a purge material recommendation display section 4p which is provided on a display 4 and displays the message indicating that the purge material is necessary. The molding machine is desirably an injection molding machine M.

Advantageous Effects of Invention

The resin switching assist method and apparatus 1 for a molding machine according to the present invention achieve remarkable effects as follows.

[1] The zero shear viscosity $\eta$of of the former resin Rf and the zero shear viscosity $\eta$os of the succeeding resin Rs are obtained from the first database DB1 by inputting the MFR of the former resin Rf and the MFR of the succeeding resin Rs to the molding machine controller 3, the viscosity difference $\eta$d between the zero shear viscosity $\eta$of of the former resin Rf and the zero shear viscosity $\eta$os of the succeeding resin Rs is obtained, an amount of a purge resin required for resin switching is obtained, as a purge resin required amount Wu, from the second database DB2, and at least the obtained purge resin required amount Wu is displayed. Therefore, it is possible to eliminate the conventionally performed testing work which is performed by using a molding machine owned by a user and which follows a resin switching process in which actual resins are used. As a result, it is possible to increase production efficiency and reduce production cost and obtain an appropriate purge resin required amount Wu by an assist method which is high in stability and reliability. Thus, it is possible to realize an assist method most suitable for a novice or the like which is unfamiliar with resin switching and easily and to quickly obtain the purge resin required amount Wu (i.e., the amount of a purge resin required for resin switching).

[2] In a preferred mode in which the succeeding resin Rs contains an intermediate material Rms, since the purge resin required amount Wu for the intermediate material Rms can be known, an effect similar to that for the succeeding resin Rs can be obtained for the intermediate material Rms.

[3] In a preferred mode in which a message indicating that a purge material is necessary is output when the zero shear viscosity $\eta$os of the succeeding resin Rs is lower than the zero shear viscosity $\eta$of of the former resin Rf, since a substantial determination as to whether or not a purge material is necessary is made, the operator can quickly know the necessity of the purge material, and it is possible to contribute to reduction of material cost, shortening of resin switching time, and suppression of generation of useless defective articles.

[4] In a preferred mode in which the heating cylinder 2 is divided into three regions in an axial direction such that the heating cylinder has the forward portion 2f, the middle portion 2m, and the rear portion 2r, a region containing the forward portion 2f and a portion located forward of the forward portion is defined as the high-temperature-side region ZAu, a region containing the middle portion 2m and a portion located rearward of the middle portion is defined as the low-temperature-side region ZAd, and the temperature of the heating cylinder 2 is set such that the temperature difference between the high-temperature-side region ZAu and the low-temperature-side region ZAd falls within the range of 0° C. to 50° C., since it is possible to set the operation environment of the molding machine (injection molding machine) M such that the molding machine M operates efficiently, an appropriate purge resin required amount Wu which enables more efficient operation can be obtained.

[5] In a preferred mode in which the resins include general-purpose resins, engineering plastics, super engineering plastics, composite materials, purge materials, and special resins other than the purge materials, since the resin switching assist method can be applied to a wide range of resin materials, the resin switching assist method is high in flexibility.

[6] In a preferred mode in which, when the zero shear viscosity $\eta$os of the succeeding resin Rs is lower than the zero shear viscosity $\eta$of of the former resin Rf, the viscosity difference calculating functional section Fs of the assist apparatus 1 outputs a message indicating that a purge material is necessary, and the display processing functional section Fo has a purge material recommendation display section 4p which is provided on a display 4 and displays the message indicating that the purge material is necessary, since the operator (user) can surely know the necessity of the purge material by viewing the display 4, the operator can quickly take necessary measures, such as preparations related to the purge material.

[7] In a preferred mode in which the molding machine is an injection molding machine, since the resin switching assist method can be used in the injection molding machine which has a high requirement for resin switching assistance, most desired performance can be attained.

DESCRIPTION OF EMBODIMENTS

Next, a preferred embodiment of the present invention will be described in detail based on the drawings.

First, the structure of an injection molding machine M (molding machine) which can carry out a resin switching assist method according to the present embodiment will be described with reference to FIGS. 2 to 4.

Figure 2:
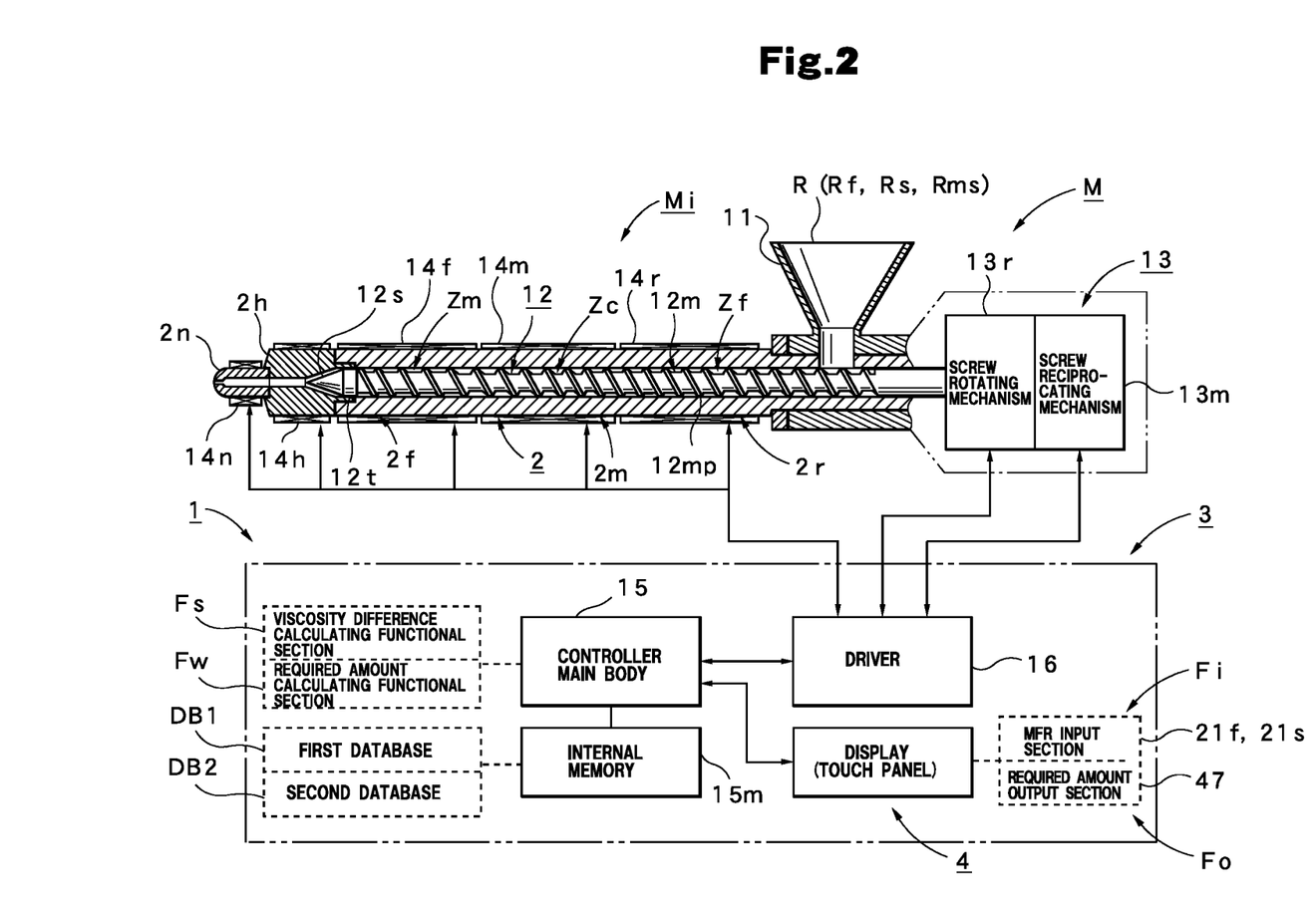
FIG. 2 is an overall configurational diagram of an injection molding machine which includes a block diagram of an assist apparatus used for carrying out the resin switching assist method.

FIG. 2 shows the injection molding machine M; in particular, an injection machine Mi from which a mold clamping device is omitted. The injection machine Mi includes a heating cylinder 2. A nozzle 2n is fixedly attached to a forward end portion of the heating cylinder 2 via a head portion 2h. A hopper 11 is provided in an upper portion of a rear end of the heating cylinder 2. The nozzle 2n has a function of injecting a resin melted in the heating cylinder 2 into a mold (mold clamping device). The hopper 11 has a function of supplying to the heating cylinder 2 resins (molding materials) R; i.e., former resin Rf and succeeding resin Rs including intermediate material Rms, which will be described later.

In the case where the resin switching assist method according to the present embodiment is applied to the injection molding machine as described above, since the resin switching assist method can be used for the injection molding machine which has a high requirement for resin switching assistance, most desired performance can be attained. Also, since the intermediate material Rms can be contained in the succeeding resin Rs, the purge resin required amount Wu for the intermediate material Rms can be known. As a result, an effect similar to that for the succeeding resin Rs can be obtained for the intermediate material Rms.

A screw 12 is disposed in the heating cylinder 2 in such a manner that the screw 12 can rotate and can move forward and backward. The screw 12 includes a screw main body portion 12m having a spiral flight portion 12mp formed thereon. The screw 12 also includes a torpedo portion 12t and a screw forward end portion 12s, which are provided at a forward end of the screw main body portion 12m. The screw main body portion 12m has a metering zone Zm, a compression zone Zc, and a feed zone Zf, which are arranged in this order from a forward side toward a rearward side. A rear end portion of the screw 12 is coupled with a screw drive section 13. This screw drive section 13 includes a screw rotating mechanism 13r for rotating the screw 12 and a screw reciprocating mechanism 13m for advancing and retracting the screw 12. A system for driving the screw rotating mechanism 13r and the screw reciprocating mechanism 13m may be a hydraulic system in which a hydric circuit is used or an electric system in which electric motors are used. Namely, no limitation is imposed on the drive system.

The heating cylinder 2 has a heating cylinder forward portion 2f, a heating cylinder middle portion 2m, and a heating cylinder rear portion 2r, which are arranged in this order from the forward side (the side where the nozzle 2n is present) toward the rearward side. A forward portion heating section 14f, and a middle portion heating section 14m, and a rear portion heating section 14r are respectively provided on the outer circumferential surfaces of the portions 2f, 2m, and 2r. Similarly, a head heating section 14h is provided on the outer circumferential surface of the head portion 2h, and a nozzle heating section 14n is provided on the outer circumferential surface of the nozzle 2n. Each of these heating sections 14f, 14m, 14r, 14h, and 14n can be composed of a band heater or the like.

Reference sign 3 shows a molding machine controller which controls the entirety of the injection molding machine M. The molding machine controller 3 includes a controller main body 15 and a display 4 connected to the controller main body 15. The controller main body 15 includes pieces of hardware such as a CPU and an internal memory 15m added to the control main body 15 and provides a computer function. Since the display 4 has a touch panel, an operator can perform various types of operation such as setting, selection, and input by using the display 4. Also, the display 4 can display various types of screens. In particular, in the present embodiment, the display 4 displays a resin switching setting screen Hc shown in FIG. 3 and a condition table display screen Hm shown in FIG. 4.

The screw rotating mechanism 13r and the screw reciprocating mechanism 13m, which have been described above, are connected to the controller main body 15 via a driver 16, and the above-described heating sections 14f, 14m, 14r, 14h, and 14n are connected to the controller main body 15 via the driver 16. As a result, through the driver 16, the control main body 15 can drive and control the screw rotating mechanism 13r and the screw reciprocating mechanism 13m, and can energize and control the heating sections 14f, 14m, 14r, 14h, and 14n.

Accordingly, the molding machine controller 3 includes an HMI (human machine interface) control system and a PLC (programmable logic controller) control system, and a PLC program and an HMI program are stored in the internal memory 15m. Notably, the PLC program is a piece of software for realizing, for example, sequence operations of the injection molding machine M in various steps, monitoring of the injection molding machine M. The HMI program is a piece of software for realizing, for example, setting and display of operation parameters of the injection molding machine M and display of operation monitor data of the injection molding machine M. The molding machine controller 3 constitutes (also serves as) a resin switching assist apparatus 1 according to the present embodiment.

Next, a basic assist method provided by the resin switching assist method according to the present embodiment will be described with reference to Tables 1 and 2 and FIGS. 5 to 8.

This resin switching assist method is a method for estimating a purge resin required amount Wu (an amount of a purge resin required for resin switching) when the resin switching (including the case of switching to a resin which is the same type as former resin but differ in color from the former resin) is performed. Conventionally, a molding machine itself was used as a testing machine, the viscosity (apparent viscosity) of a resin to be used was actually determined, and the purge resin required amount Wu was predicted from the determined viscosity. The resin switching assist method has made it possible to estimate an appropriate purge resin required amount Wu corresponding to a resin to be used, by using its MFR value which is known and available from a catalog or the like; i.e., by merely inputting a numerical value.

First, in order to check its usefulness, a verification test related to the resin switching assist method according to the present embodiment was performed.

In the verification test, a resin switching test was carried out by using an injection molding machine in which a standard screw of ϕ26 was used. Table 1 shows a list of purging conditions in the resin switching test.

TABLE 1

| Items | Condition values | Unit |
|---|---|---|
| Temperature of high-temperature-side region | 250 | ° C. |
| Temperature of low-temperature-side region | 200 | ° C. |
| Rotational speed | 200 | rpm |
| Purge speed | 100 | mm/s |
| Back pressure | 0.5 | MPa |
| Limit pressure | 196 | MPa |
| Former purge (mm) × number of times | 50 × 5 | |
| Succeeding purge (mm) × number of times | 10 × 20 | |
| Empty purge (mm) × number of times | 50 × 5 | |

In Table 1, the temperature of the high-temperature-side region (ZAu in FIG. 5) means the temperature of the nozzle 2n, head portion 2h, and forward portion 2f of the heating cylinder 2, and the temperature of the low-temperature-side region (ZAd in FIG. 5) means the temperature the middle portion 2m and rear portion 2r of the heating cylinder 2.

In the verification test, a black former resin Rf was first prepared such that the amount of masterbatch became 1 wt %, and was charged into the heating cylinder 2. Subsequently, under the purging conditions shown in Table 1, purging was performed using a succeeding resin Rs (LDPE). After that, an operator removed and cooled the screw and peeled the resin from the screw. Thus, the operator visually checked whether or not the former resin Rf remained. When the former resin Rf remained, the succeeding resin Rs (500 g) was added and the purging was continued. This operation was repeated until the former resin Rf disappeared. The purge resin amount at the time when the former resin Rf disappeared completely was obtained.

For calculation of zero shear viscosity, the following Expression 101 was used.

$$\eta = \eta o \gamma^{n-1} \exp\{C(T-Tr)\} \qquad \text{Expression 101}$$

In Expression 101, η represents shear viscosity (Pa·s), ηo represents zero shear viscosity (Pa·s), γ represents rate of shear (1/sec), n represents viscosity index, C represents temperature constant, T represents measured temperature (° C.), and Tr represents reference temperature (° C.)

Figure 5:
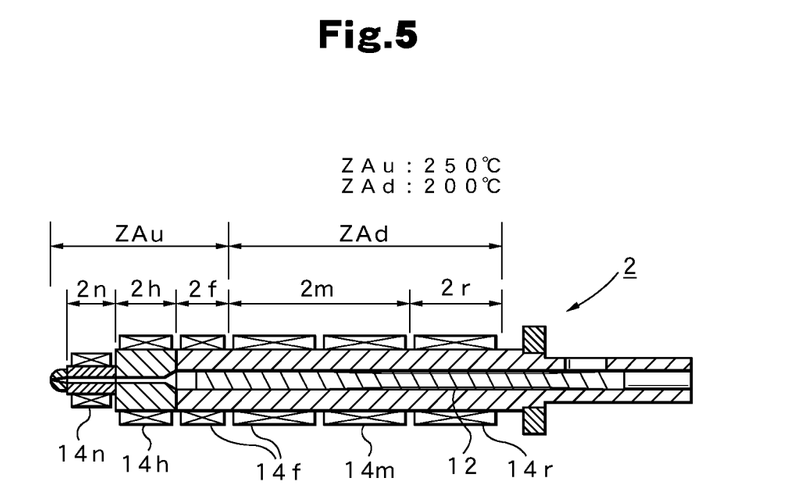
FIG. 5 is a schematic view of a heating cylinder used for describing set temperatures in a test for verifying the effectiveness of the resin switching assist method.

Table 2 shows a list of zero shear viscosities ηo of different resins R measured at 200° C. and 250° C. FIG. 5 shows the temperature ranges of the heating cylinder 2.

TABLE 2

| Resin type | ηo (200° C.) | ηo (250° C.) |
|---|---|---|
| A | 7285.9 | 3297.2 |
| B | 18507.0 | 4377.8 |
| C | 1384.1 | 365.0 |
| D | 22067.0 | 5811.8 |
| E | 12337.3 | 6494.4 |
| F | 32917.5 | 5117.8 |

The purge resin required amount Wum was obtained from these zero shear viscosities by using the following Expression 102.

$$Wum^{-1} \propto (\eta os - \eta of) + (\eta os - \eta ofe) \qquad \text{Expression 102}$$

ηof: zero shear viscosity of succeeding resin at 200° C.
ηofe: zero shear viscosity of former resin at 250° C.

In this case, the heating cylinder 2 is divided into three regions (i.e., the forward portion 2f, the middle portion 2m, and the rear portion 2r) in the axial direction; a region containing the forward portion 2f and portions located forward of the forward portion 2f is defined as a high-temperature-side region ZAu and a region containing the middle portion 2m and the rear portion 2r is defined as a low-temperature-side region ZAd; and, as shown in the example, the temperature of the high-temperature-side region ZAu is set to 250° C., and the temperature of the low-temperature-side region ZAd is set to 200° C. In this case, the purge resin required amount Wum, which is the required amount of the succeeding resin Rs, is predicated to be proportional to a value obtained by adding together difference values obtained from the zero shear viscosities ηos, ηof, and ηofe, as shown by Expression 102.

Notably, the temperature difference between the high-temperature-side region ZAu and the low-temperature-side region ZAd is desirably set to fall within the range of 0° C. to 50° C. Since such setting enables setting of the operation environment of the molding machine (injection molding machine) M such that the molding machine operates efficiently, an appropriate purge resin required amount Wu which enables more efficient operation can be obtained.

Theoretically, the larger the difference in zero shear viscosity between the former resin Rf in the high-temperature-side region ZAu and the succeeding resin Rs which succeeds the former resin Rf and has the zero shear viscosity of the low-temperature-side region ZAd, the greater the easiness with which the former resin Rf is discharged from the high-temperature-side region ZAu. Also, in the low-temperature-side region ZAd, conceivably, the greater the difference in zero shear viscosity between the succeeding resin Rs and the former resin Rf at that temperature, the greater the easiness with which the former resin Rf is discharged. Notably, in the case of switching between resins which are of the same type but differ in color, since the difference in apparent viscosity in the low-temperature-side region ZAd always becomes zero, the purge resin required amount becomes larger as compared with the case of ordinary resin switching. Therefore, as the value of the right side of Expression 102 increases to the positive side, the purge resin required amount Wum decreases.

The zero shear viscosities ηo of the former resin Rf and the succeeding resin Rs (the intermediate material Rms) were predicted through calculation from MFR values.

Namely, on the basis of the MFR value (described in a catalog) of each resin R, a change in shear viscosity and further the zero shear viscosity ηo were predicted in accordance with the following Expression 103.

$$\eta o = f(kx, \text{MFR value}, Th) \qquad \text{Expression 103}$$

Figure 6:
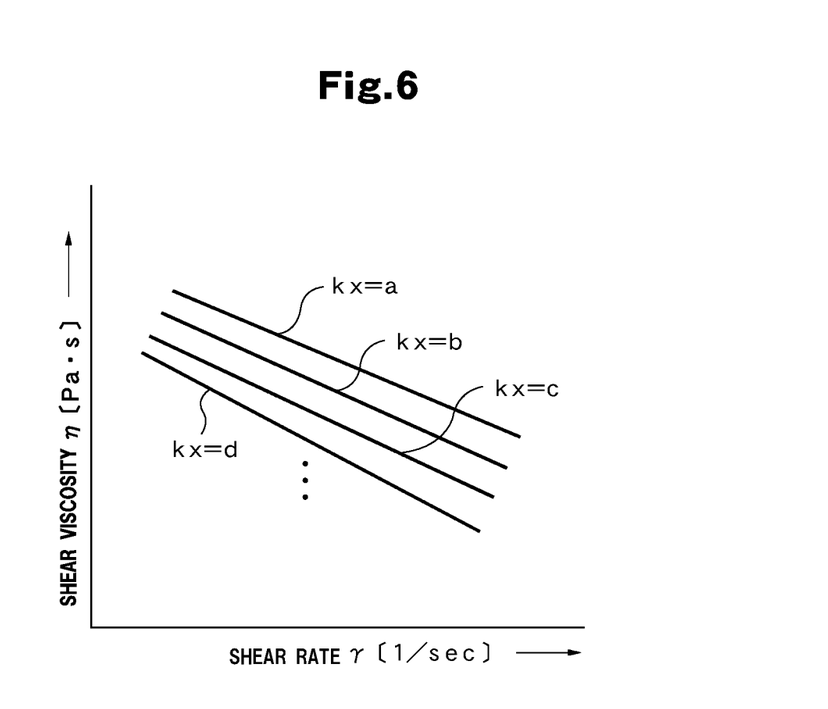
FIG. 6 is a characteristic diagram which shows the relation between shear rate and shear viscosity and which is used for describing coefficients of a conversion function expression for obtaining zero shear viscosities in the resin switching assist method.

Here, kx represents a coefficient which is proportional to the heating cylinder temperature Th and the MFR value. Since the zero shear viscosity ηo of each resin R is set on the basis of the heating cylinder temperature Th and the MFR value which is a parameter which differs among the different resins R, the coefficient kx in Expression 103 is set such that different values a, b, c, d, etc., are individually used, as the coefficient kx, for the different resins R. Because of the difference among the values of the coefficient kx (=a, b, c, d, etc.), as shown in FIG. 6, the relation between shear rate γ (1/sec) and shear viscosity η (Pa·s) changes depending on the value of the coefficient kx. Therefore, the value of the coefficient kx can be set to a proper value beforehand through, for example, an experiment.

Subsequently, the viscosity difference ηd between the obtained zero shear viscosities 10; namely, the viscosity difference ηd (=ηof−ηos) between the zero shear viscosity ηof of the former resin Rf and the zero shear viscosity ηos of the succeeding resin Rs, was obtained. The obtained viscosity differences ηd of the different resins R are shown in the form of a table in FIG. 7.

Figure 8:
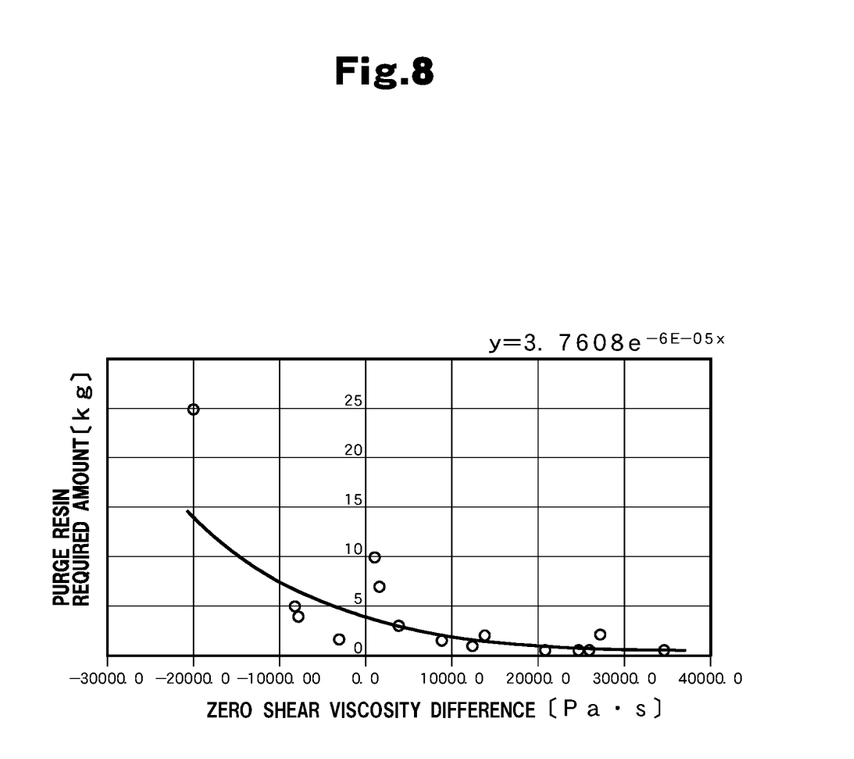
FIG. 8 is a graph showing the relation between zero shear viscosity difference and purge resin required amount determined in the test.

There was considered the relation between the viscosity difference ηd and the purge resin required amount Wu which was obtained by the verification test and indicated the amount of the succeeding resin Rs required for complete discharge of the former resin Rf. FIG. 8 is a correlation graph showing the relation between the viscosity difference ηd and the purge resin required amount Wu. Notably, the purge resin required amount Wum is the amount of the succeeding resin Rf required to be fed in the above-described verification test until the former resin Rf was discharged completely. As is apparent from FIG. 8, the purge resin required amount based on the MFR value is usable.

The amount Wu of the succeeding resin which becomes necessary in actuality can be obtained by the following Expression 104.

$$Wu = [Du \times 3.7608 \times \exp(-6E-5 \times (2\eta p(X) - \eta q(X) - \eta q(Y)))]/Do \qquad \text{Expression 104}$$

Wu: the required amount of the succeeding resin
Du: the screw diameter of a molding machine to be used
Do: the standard screw diameter
ηq(X): the zero shear viscosity of the former resin at the time when the heating cylinder temperature in the low-temperature-side region is X (° C.)
ηq(Y): the zero shear viscosity of the former resin at the time when the heating cylinder temperature in the high-temperature-side region is Y (° C.)
ηp(X): the zero shear viscosity of the succeeding resin at the time when the heating cylinder temperature in the low-temperature-side region is X (° C.)

Figure 7:
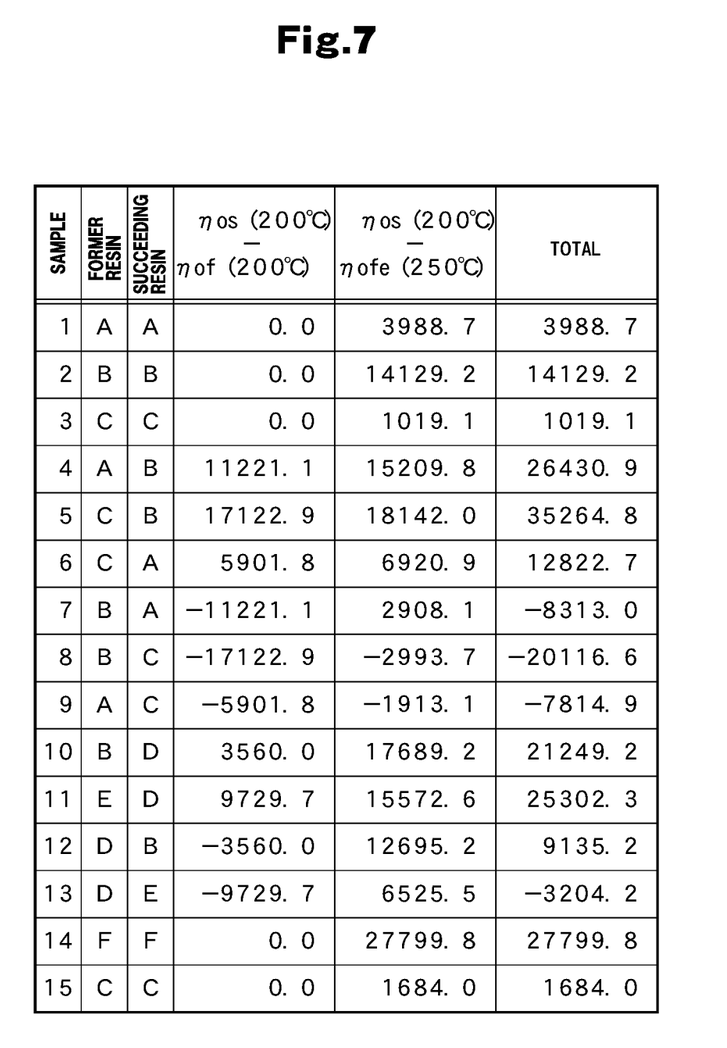
FIG. 7 is a data table showing viscosity differences between zero shear viscosities of former resins and zero shear viscosities of succeeding resins obtained in the test.

Expression 104 is a calculation expression (prediction expression) for obtaining the succeeding resin amount Wu which becomes necessary in the case where Expression 102 is applied to other molding machines. The values of the coefficients in Expression 104 are obtained from FIG. 8 in which the results shown in FIG. 7 are plotted, and, when the number of data increases, the coefficient values are changed.

Next, the specific configuration of the resin switching assist apparatus 1 according to the present embodiment will be described with reference to FIGS. 2 to 4.

As shown in FIG. 2, the resin switching assist apparatus 1 utilizes the controller main body 15, which is provided in the molding machine controller 3 and has the internal memory 15m, and the display 4, which is provided in the molding machine controller 3 and has the touch panel. The resin switching assist apparatus 1 includes, as basic configurational elements, a first database DB1 and a second database DB2 stored in the internal memory 15m, an MFR inputting functional section Fi, a viscosity difference calculating functional section Fs, a required amount calculating functional section Fw, and a display processing functional section Fo, which function as a part of the molding machine controller 3.

Figure 3:
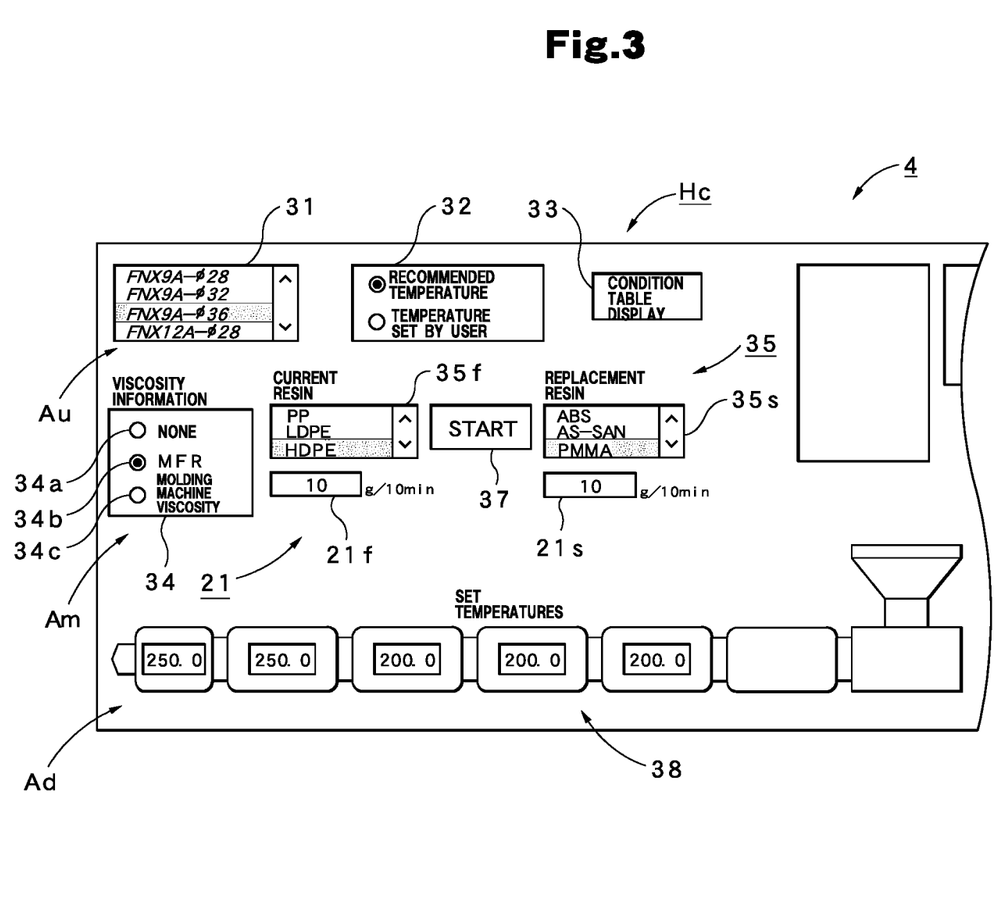
FIG. 3 is a partially omitted display screen view of a setting screen displayed on a display provided in the assist apparatus used for carrying out the resin switching assist method.
Figure 4:
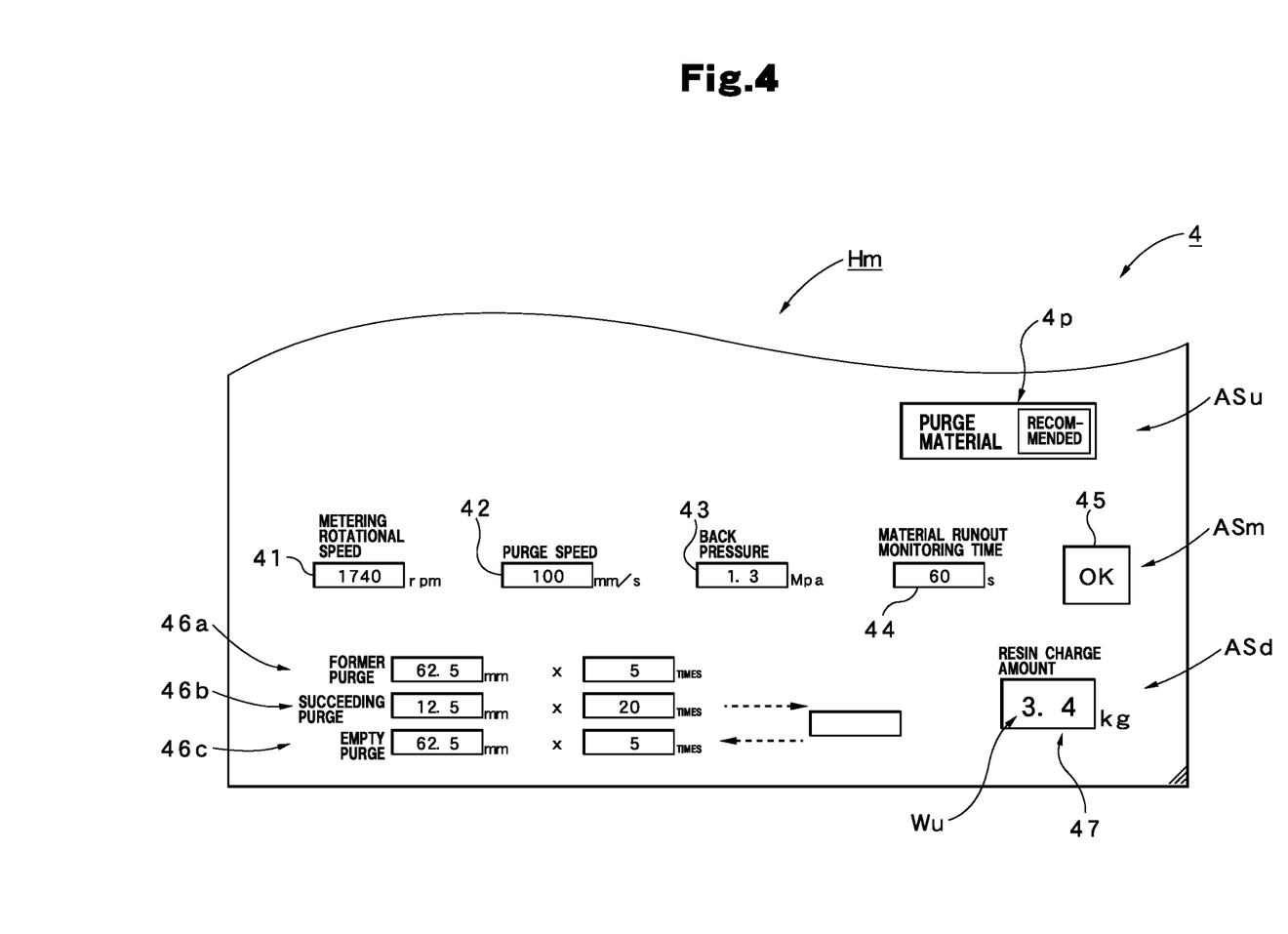
FIG. 4 is a partially omitted display screen view of a condition table displayed on the display.

The display 4 displays the resin switching setting screen Hc and the condition table display screen Hm which are shown in FIGS. 3 and 4, respectively, and which relate to the present invention. Basically, the resin switching setting screen Hc is used to set various types of operating conditions relating to resin switching, such as purge conditions, etc. The condition table display screen Hm is used to display a condition table relating to resin switching.

The resin switching setting screen Hc shown in FIG. 3 has an upper area Au, a middle area Am, and a lower area Ad. A molding machine (screw) setting column 31 is disposed on the right side of the upper area Au, a temperature setting selection column 32 is disposed on the right side of the setting column 31, and a "condition table display" key 33 is disposed on the right side of the selection column 32. A viscosity information selection column 34 is disposed on the left side of the middle area Am. This viscosity information selection column 34 enables an operator to select one of "none" denoted by 34a, "MFR" denoted by 34b and used in the present invention, and "molding machine viscosity" denoted by 34c.

A resin selection section 35 is disposed on the right side of the selection column 34. The resin selection section 35 includes a current resin (former resin Rf) selection column 35f disposed on the left side, a replacement resin (succeeding resin Rs) selection column 35s disposed on the right, and a "START" key 37 disposed between the selection columns 35f and 35s. An MFR input section 21f for inputting the MFR value of a resin selected as the current resin is provided on the lower side of the current resin selection column 35f, and an MFR input section 21s for inputting the MFR value of a resin selected as the replacement resin is provided on the lower side of the replacement resin selection column 35s. These MFR input sections 21f and 21s constitute the above-described MFR inputting functional section Fi.

In this case, selectable resins may include general-purpose resins, engineering plastics, super engineering plastics, composite materials, purge materials, and special resins other than the purge materials. As described above, the resin switching assist method according to the present embodiment can be applied to a wide range of resin materials, and therefore, is high in flexibility.

In the lower area Ad, a set temperature display section 38 having the shape of the heating cylinder of the molding machine is provided. Therefore, this set temperature display section 38 displays the temperatures of various parts of the heating cylinder arranged from the forward side; namely, the temperature of the nozzle, the temperature of the head, the temperature of the forward portion of the heating cylinder, the temperature of the middle portion of the heating cylinder, and the temperature of the rear portion of the heating cylinder.

The condition table display screen Hm shown in FIG. 4 can be displayed by turning on the "condition table display" key 33 in the resin switching setting screen Hc.

The condition table display screen Hm shown in FIG. 4 has an upper area ASu, a middle area ASm, and a lower area ASd. A purge material recommendation display section 4$p$ is provided in the upper area ASu. When the viscosity difference calculating functional section Fs determines that the zero shear viscosity $\eta$os of the succeeding resin Rs is lower than the zero shear viscosity $\eta$of of the former resin Rf, the purge material recommendation display section 4$p$ can warn the operator by brightening or blinking the purge material recommendation display section 4$p$, thereby outputting a message indicating that a purge material is necessary. Since the purge material recommendation display section 4$p$ for displaying the message indicating the necessity of a purge material is provided in the display processing functional section Fo, the operator (user) can know the message indicating the necessity of a purge material from the display 4 without fail, the operator can quickly make preparations related to the purge material.

In the middle area ASm of the condition table display screen Hm, a metering rotational speed display column 41, a purge speed display column 42, a back pressure display column 43, a material runout monitoring time display column 44, and an "OK" key 45 are arranged in this order from the left side toward the right side. A former purge condition display column 46$a$, a succeeding purge condition display column 46$b$, and an empty purge condition display column 46$c$ are provided in the lower area ASd of the condition table display screen Hm. A movement stroke and the number of times are displayed in each of the display columns 46$a$, 46$b$, and 46$c$. A resin charge amount display section 47 is provided at the right end of the lower area ASd.

The first database DB1 and the second database DB2 are used by the respective functional sections which constitute the resin switching assist apparatus 1. For each of different resins R (which differ in resin type and/or color), its zero shear viscosity $\eta$o is obtained from the functional expression (Expression 103) whose parameters are the MFR value of the resin R and the set temperature of the heating cylinder 2, and the obtained zero shear viscosity $\eta$o is registered in the first database DB1. The MFR value (g/10 min) is one of resin characteristics representing the flowability of molten resin, and a numerical value (MFR value) described in a catalog of molding materials (resins R) or the like can be used.

Purge resin required amounts Wu each corresponding to viscosity difference $\eta$d(=$\eta$of–$\eta$os) between the zero shear viscosity $\eta$of of a former resin Rf and the zero shear viscosity $\eta$os of a succeeding resin Rs are registered in the second database DB2.

The MFR inputting functional section Fi has a function of enabling the operator to input the MFR value of the former resin Rf and the MFR value of the succeeding resin Rs and includes the MFR input section 21 which is provided in the resin switching setting screen Hc displayed on the display 4 shown in FIG. 3 and which includes the MFR input section 21$f$ used to input the MFR value of the current resin (the former resin Rf) and the MFR input section 21$s$ used to input the MFR value of the replacement resin (the succeeding resin Rs).

The viscosity difference calculating functional section Fs has a function of reading the zero shear viscosity $\eta$of of the former resin Rf and the zero shear viscosity $\eta$os of the succeeding resin Rs from the first database DB1 on the basis of the MFR values input from the MFR input section 21 and calculating the viscosity difference $\eta$d(=$\eta$of –$\eta$os) between the zero shear viscosity $\eta$of of the former resin Rf and the zero shear viscosity $\eta$os of the succeeding resin Rs.

The required amount calculating functional section Fw has a function of obtaining the purge resin required amount Wu (an amount of a purge resin required for resin switching) from the second database DB2 on the basis of the obtained viscosity difference $\eta$d. The display processing functional section Fo has a function of displaying the obtained purge resin required amount Wu in the resin charge amount display section 47 in the condition table display screen Hm of FIG. 4 displayed on the display 4.

Figure 1:
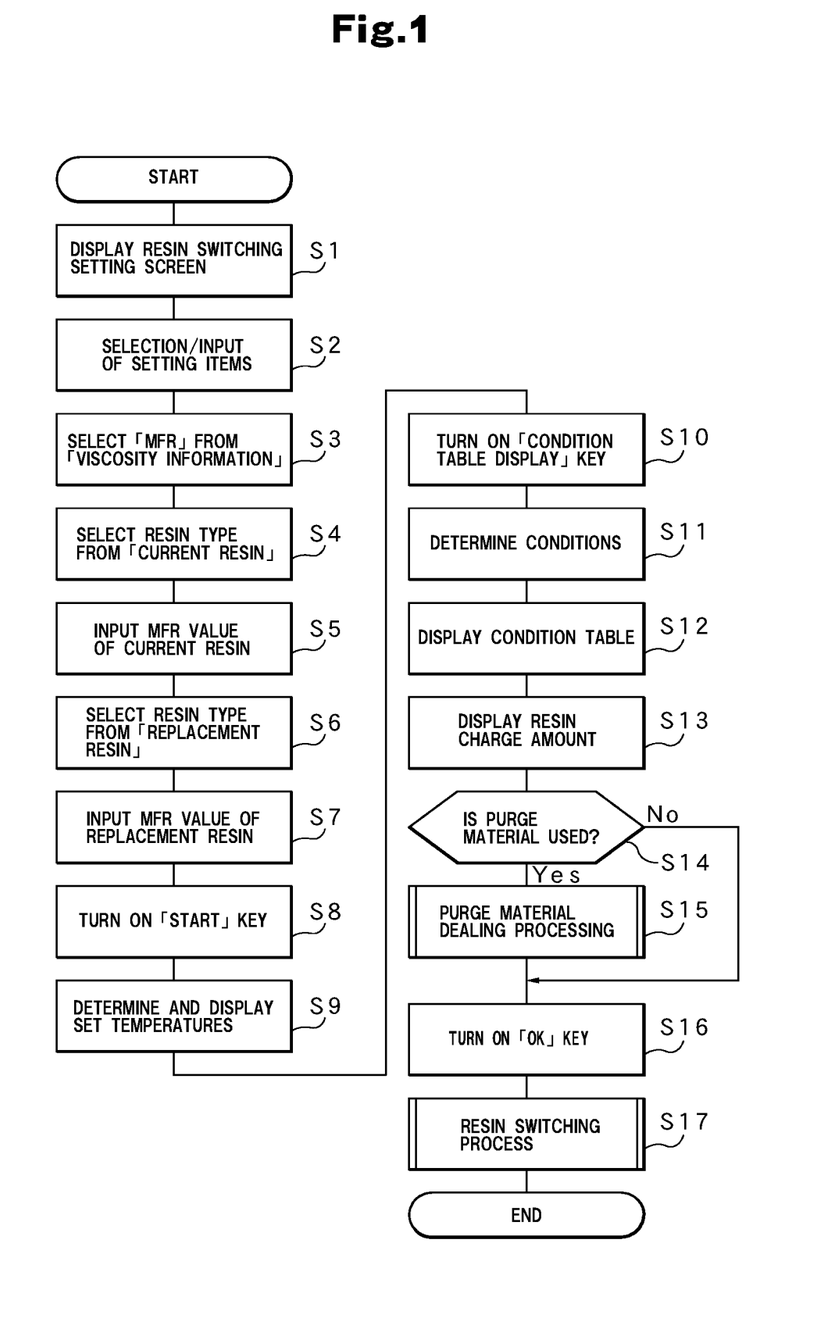
FIG. 1 is a flowchart used for describing processing steps of a resin switching assist method according to a preferred embodiment of the present invention.

Next, the resin switching assist method which is carried out by using the resin switching assist apparatus 1 according to the present embodiment will be described specifically on the basis of the flowchart shown in FIG. 1 and with reference to FIGS. 2 to 8.

Here, it is assumed that a series of production performed by using a predetermined resin (former resin Rf) has ended, and the resin is switched to a next resin (succeeding resin Rs), thereby moving to the next series of production. Upon completion of the production in which the former resin Rf was used, the operator causes the assist apparatus 1 to display the resin switching setting screen Hc shown in FIG. 3 on the display 4 (step S1). Subsequently, the operator first performs selection or input of various setting items (step S2). In the case of the illustrated example, selection of the model of a molding machine to be used, including screw size, by the molding machine setting column 31, selectin of temperature setting mode to be used by the temperature setting selection column 32, etc. can be performed.

Subsequently, selection of viscosity information is performed by the viscosity information selection column 34. In the present embodiment, since a piece of information representing MFR is used, the operator selects "MFR" 34$b$ (step S3). Also, the operator selects the resin type of the current resin (namely, former resin Rf), used in the previous production, from the resin types displayed in the current resin selection column 35$f$ of the resin selection section 35 (step S4). The illustrated example shows a state in which "HDPE" has been selected. Subsequently, the operator enters the MFR value of the current resin (former resin Rf) in the MFR input column 21$f$ (step S5). The illustrated example shows a state in which "10" has been entered.

Furthermore, the operator selects the resin type of the replacement resin (namely, succeeding resin Rs), which replaces the former resin, from the resin types displayed in the replacement resin selection column 35$s$ (step S6). The illustrated example shows a state in which "PMMA" has been selected. Subsequently, the operator enters the MFR value of the replacement resin (succeeding resin Rs) in the MFR input column 21$s$ (step S7). The illustrated example shows a state in which "10" has been entered.

After completion of the above-described setting, the operator turns on the "START" key 37. As a result, the heating temperatures of the heating cylinder 2, which correspond to the selected resin types, are determined and are displayed in the set temperature display section 38 as set temperatures (step S9). Namely, the temperature of the nozzle, the temperature of the head, the temperature of the forward portion of the heating cylinder, the temperature of the middle portion of the heating cylinder, and the temperature of the rear portion of the heating cylinder are respectively displayed in the respective display columns of the set temperature display section 38.

Subsequently, the operator turns on the "condition table display" key 33 (step S10). As a result, operation conditions during purging are determined, the purging conditions are determined, and the determined operation conditions and purging conditions are displayed in the condition table display screen Hm shown in FIG. 4 (steps S11 and S12). The operation conditions include metering rotational speed, purge speed, back pressure, material runout monitoring time, etc. As the purging conditions, a movement stroke of the screw and the number of times are displayed in each of the former purge condition display column 46a, the succeeding purge condition display column 46b, and the empty purge condition display column 46c. Also, the amount of the resin which is required for purging; i.e., the required resin charge amount (kg), is displayed in the resin charge amount display section 47 (step S13).

Meanwhile, the purge material recommendation display section 4p is provided in the condition table display screen Hm. When the viscosity difference calculating functional section Fs determines that the zero shear viscosity $\eta os$ of the succeeding resin Rs is lower than the zero shear viscosity $\eta of$ of the former resin Rf, the purge material recommendation display section 4p outputs a message indicating that a purge material is necessary, by brightening or blinking the purge material recommendation display section 4p.

In this manner, a substantial determination as to whether or not a purge material is necessary is made, and the operator (user) can quickly and surely know the necessity of the purge material by viewing the display 4. Therefore, the operator can quickly take necessary measures, such as preparations related to the purge material (steps S14 and S15). As a result, it is possible to contribute to reduction of material cost, shortening of resin switching time, and suppression of generation of useless defective articles.

After completion of the above-described preparation, the operator performs final checking, and, when the operator determines that there is no problem, the operator turns on "OK" key 45 (step S16). As a result, a series of resin switching steps is performed (step S17).

According to the above-described resin switching assist method (apparatus) according to the present embodiment, the following procedure is employed as a basic technique. In advance of resin switching, for each type of resin R, the zero shear viscosity $\eta o$ of each resin is obtained by using a conversion function expression whose parameters are melt flow rate (MFR) and the set temperature of the heating cylinder 2, and the obtained zero shear viscosity $\eta o$ is registered in the first database DB1 in the molding machine controller 3, and the purge resin required amount Wu corresponding to the viscosity difference $\eta d$ between the zero shear viscosity $\eta of$ of a former resin Rf and the zero shear viscosity $\eta os$ of a succeeding resin Rs is registered in the second database DB2 in the molding machine controller 3. When resin switching is performed, by inputting the MFR of the former resin Rf and the MFR of the succeeding resin Rs to the molding machine controller 3, the zero shear viscosity $\eta of$ of the former resin Rf and the zero shear viscosity $\eta os$ of the succeeding resin Rs are obtained from the first database DB1, the viscosity difference $\eta d$ between the zero shear viscosity $\eta of$ of the former resin Rf and the zero shear viscosity $\eta os$ of the succeeding resin Rs is obtained, and the purge resin required amount Wu (i.e., the amount of a purge resin required for resin switching) is obtained from the second database DB2. At least the obtained purge resin required amount Wu is displayed. Therefore, it is possible to eliminate the conventionally performed testing work which is performed by using a molding machine owned by a user and which follows a resin switching process in which actual resins are used. As a result, it is possible to increase production efficiency and reduce production cost and obtain an appropriate purge resin required amount Wu by an assist method which is high in stability and reliability. Thus, it is possible to realize an assist method most suitable for a novice or the like which is unfamiliar with resin switching and easily and quickly obtain the purge resin required amount Wu (i.e., the amount of a purge resin required for resin switching).

The preferred embodiment has been described in detail. However, the present invention is not limited to such embodiment, and, as to structures of details, shapes, raw materials, materials, quantities, numerical values, methods, etc., alteration, addition, and deletion can be performed arbitrarily within a range not departing from the gist of the present invention.

For example, "resin switching" is a concept which encompasses not only switching between resins of different types but also switching between resins which are of the same type but differ in color. An example in which MFRs (MFR values) described in a catalog of resins are used is shown. However, various types of numerical values, such as numerical values described in various types of materials and numerical values obtained by an experiment or the like, can be utilized. Also, the succeeding resin Rs may include an intermediate material Rms. In this case, resin switching can be performed in the same manner by replacing the succeeding resin Rs with the intermediate material Rms. In the case where the heating cylinder 2 is divided into three regions in the axial direction such that the heating cylinder has the forward portion 2f, the middle portion 2m, and the rear portion 2r, a region containing the forward portion 2f and a portion located forward of the forward portion is defined as a high-temperature-side region ZAu, and a region containing the middle portion 2m and a portion located rearward of the middle portion is defined as a low-temperature-side region ZAd, it is desired that the temperature of the heating cylinder 2 is set such that the temperature difference between the high-temperature-side region ZAu and the low-temperature-side region ZAd falls within the range of 0° C. to 50° C. However, this is not essential. Furthermore, it is possible to use various types of resins, which include not only general-purpose resins, but also engineering plastics, super engineering plastics, composite materials, purge materials, and special resins other than the purge materials. Also, in the illustrated example, the display processing functional section Fo has the purge material recommendation display section 4p provided on the display 4 and displaying a message indicating that a purge material is necessary. However, other various types of means (for example, displaying means other than the display or voice (sound)) can be utilized so as to report that a purge material is necessary.

INDUSTRIAL APPLICABILITY

The resin switching assist method and apparatus according to the present invention can be used in various types of molding machines, including injection molding machines, in which a resin switching process of switching the resin used for molding from a former resin to a different succeeding resin is performed.

REFERENCE SIGNS LIST

1: resin switching assist apparatus, 2; heating cylinder, 2f: forward portion, 2m: middle portion, 2r: rear portion, 3: molding machine controller, 4: display, 4p: purge material recommendation display section, R: resin, Rf: former resin, Rs: succeeding resin, Rms: intermediate material, 10: zero shear viscosity, DB1: first database, DB2: second database, Wu: purge resin required amount, Fi: MFR inputting functional section, Fs: viscosity difference calculating functional section, Fw: required amount calculating functional section, Fo: display processing functional section, ZAu: high-temperature-side region, ZAd: low-temperature-side region, M: injection molding machine

CITATION LIST

Patent Literature 1 JP2017-222144A

The invention claimed is:

1. A resin switching assist method for a molding machine, the method assisting an operator in performing a resin switching process of discharging a former resin from a heating cylinder and then supplying a succeeding resin to the heating cylinder, the method comprising:
in advance of the resin switching process, for each of different resins, estimating a zero shear viscosity of each resin by using a conversion function expression whose parameters are a melt flow rate and a set temperature of the heating cylinder, registering the estimated zero shear viscosity in a first database in a molding machine controller, and registering a purge resin required amount in a second database in the molding machine controller, the purge resin required amount corresponding to a viscosity difference between the zero shear viscosity of the former resin and the zero shear viscosity of the succeeding resin; and
in the resin switching process, obtaining the zero shear viscosity of the former resin and the zero shear viscosity of the succeeding resin from the first database by inputting a melt flow rate of the former resin and a melt flow rate of the succeeding resin to the molding machine controller, obtaining a viscosity difference between the zero shear viscosity of the former resin and the zero shear viscosity of the succeeding resin, obtaining an amount of a purge resin required for resin switching, as a purge resin required amount, from the second database, and displaying at least the obtained purge resin required amount.

2. The resin switching assist method for a molding machine according to claim 1, wherein the succeeding resin includes an intermediate material.

3. The resin switching assist method for a molding machine according to claim 2, wherein, when the zero shear viscosity of the succeeding resin is lower than the zero shear viscosity of the former resin, a message indicating that a purge material is necessary is displayed.

4. The resin switching assist method for a molding machine according to claim 2, wherein the heating cylinder is divided into three regions in an axial direction such that the heating cylinder has a forward portion, a middle portion, and a rear portion, a region containing the forward portion and a portion located forward of the forward portion is defined as a high-temperature-side region, a region containing the middle portion and a portion located rearward of the middle portion is defined as a low-temperature-side region, and a temperature difference between the high-temperature-side region and the low-temperature-side region is set to fall within the range of 0° C. to 50° C.

5. The resin switching assist method for a molding machine according to claim 1, wherein, when the zero shear viscosity of the succeeding resin is lower than the zero shear viscosity of the former resin, a message indicating that a purge material is necessary is displayed.

6. The A resin switching assist method for a molding machine according to claim 1, wherein the heating cylinder is divided into three regions in an axial direction such that the heating cylinder has a forward portion, a middle portion, and a rear portion, a region containing the forward portion and a portion located forward of the forward portion is defined as a high-temperature-side region, a region containing the middle portion and a portion located rearward of the middle portion is defined as a low-temperature-side region, and a temperature difference between the high-temperature-side region and the low-temperature-side region is set to fall within the range of 0° C. to 50° C.

7. The resin switching assist method for a molding machine according to claim 1, wherein the resins include general-purpose resins, engineering plastics, super engineering plastics, composite materials, purge materials, and special resins other than the purge materials.

* * * * *